W. SCHWAGERMANN.
ELECTRIC CONTROLLING APPARATUS.
APPLICATION FILED JULY 31, 1907.

943,166. Patented Dec. 14, 1909.

Witnesses
Geo. Hoffman
Edmund C. Dubocq.

William Schwagermann
Inventor
By his Attorneys
Edwards, Sager & Wooster

UNITED STATES PATENT OFFICE.

WILLIAM SCHWAGERMANN, OF YONKERS, NEW YORK, ASSIGNOR TO WARD LEONARD ELECTRIC CO., A CORPORATION OF NEW YORK.

ELECTRIC CONTROLLING APPARATUS.

943,166.   Specification of Letters Patent.   Patented Dec. 14, 1909.

Application filed July 31, 1907. Serial No. 386,331.

*To all whom it may concern:*

Be it known that I, WILLIAM SCHWAGERMANN, a citizen of the United States, residing at Yonkers, in the county of Westchester and State of New York, have invented certain new and useful Improvements in Electric Controlling Apparatus, of which the following is a full, clear, and exact specification.

My invention relates to electric controlling apparatus which is particularly of advantage in the operation of electric motors, although my invention may be applied to the control of other translating devices.

In general the object of my invention is the provision of controlling means which will be efficient and reliable in operation, secure protection of the motor from the occurrence of abnormal conditions, and to so inter-relate the parts that the possibility of any improper manipulation on the part of the operator is avoided.

In the particular form of my invention shown in the accompanying drawings, I have illustrated a starting device for electric motors which is adapted to reverse the motor and secure full speed in either direction. The parts are so inter-related that starting of the motor in one direction is impossible unless the controlling means for starting in the opposite direction has been moved to proper position. Similarly, upon reversal of the motor the starting means cannot be operated until means for starting the motor in the opposite direction has been returned to proper position.

Although my invention is shown applied to starting devices for electric motors, it will be understood that the same is likewise applicable to regulating means or to any form of controlling switches.

The various features of my invention will be understood from the following description and accompanying drawings, in which—

Figure 1:
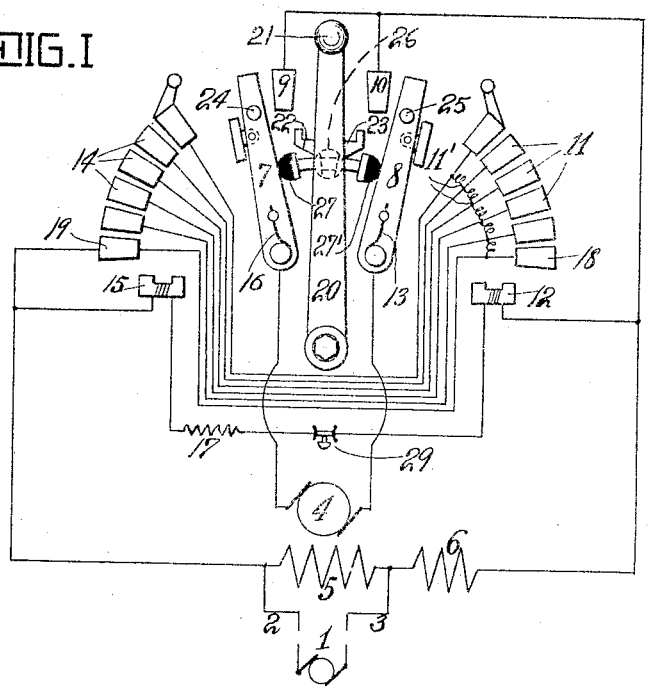
Figure 2:
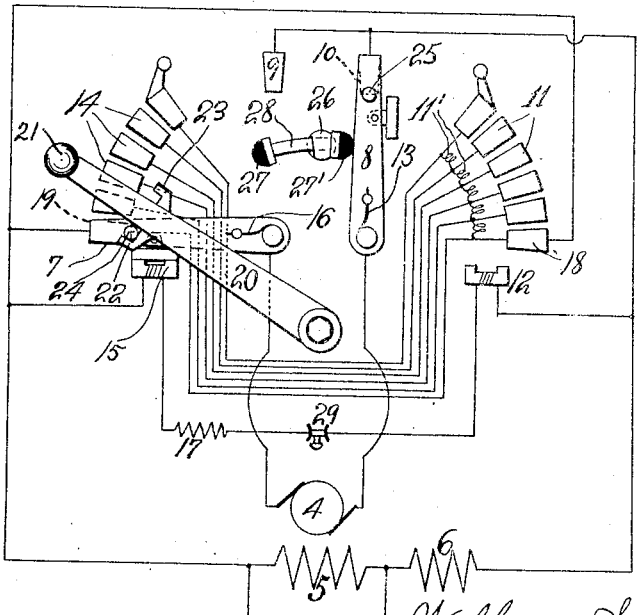

Figure 1 is a diagram showing one form of controlling apparatus and connections embodying my invention; and Fig. 2 is a similar diagram showing certain of the parts in position for operation of the motor in one direction.

Referring to the drawings, a source of constant electromotive force is indicated at 1, which supplies current to the mains 2, 3.

A motor to be controlled is shown as having an armature 4, shunt field windings 5 and series field windings 6. The shunt field winding is connected between the mains 2, 3 and the series field winding is included in the main circuit of the motor armature as shown. I have provided two independently movable elements 7, 8 for controlling the motor, each of these elements being respectively connected to a terminal of the motor armature 4. These elements are adapted to make contact respectively with the contacts 9, 10, both of which are electrically connected to the same supply main 3. The element 8 is adapted to be moved to the right and engage the contacts 11 of the motor starting resistance 11', and as the element 8 is moved gradually to its final position, the resistance will be gradually cut out of the motor circuit and so bring the motor to full speed. In the final position the arm 8 will be retained by the no-voltage magnet 12 against the action of spring 13 which tends to return the arm to engage the contact 10. The arm 7 is adapted to engage a series of contacts 14 connected to the starting resistance 11' similar to the contacts 11. The arm 7 is adapted to close the armature circuit by engagement of the initial contact 14 and in the final position all of the armature resistance is cut out of circuit and the motor attains full speed. The arm 7 is retained in final position by the novoltage magnet 15 against the action of spring 16 which tends to return the arm 7 to engagement with contact 9. Novoltage magnets 12 and 15 are shown connected across the line in series with a high resistance 17. The final resistance contacts 18, 19 are connected together electrically and to the supply main 2, the contacts 9, 10 as above stated being connected to the supply main 3. For proper operation of the motor, it is essential that one of the arms 7, 8 engage contacts 9 or 10 when the other arm is moved to cut out resistance, and the construction should be such that neither arm can be moved to start the motor or cut out resistance from the armature circuit without the other arm being placed in engagement with one of the contacts 9, 10. I secure this result by the controlling arm 20 which is located between the arms 7, 8 and adapted to impart movement to either of these arms. Arm 20 is provided with an operating handle 21 and extensions 22, 23. On the contact arm 7 is a projecting pin 24, and when the arm 20 is moved to the left this pin will be engaged by the side of arm 20 and the contact arm will be moved gradually over the resistance contacts and to final running position on contact 19. The arm 7 will then be retained in position by no-voltage magnet 15. In this final running position, the extension 22 will engage the pin 24 as shown in Fig. 2, and these arms will therefore be interlocked. Similarly when the operating arm is moved to the right it will engage the pin 25 on the arm 8 and in the final position the extension 23 will embrace pin 25 and cause the interlocking of these two arms. Fixed to the base plate or panel and between the arms 7, 8 is a stud 26 which carries a slidable piece comprising two buffers 27, 27', connected by the neck 28. These parts which serve as a distance piece for the arms 7, 8 as well as serving as a buffer for the arms 7, 8, is of such length that it will prevent arms 7, 8 from engaging contacts 9, 10 respectively at the same time, but if one of the arms is moved away from the buffer, the other arm will be forced by its spring into engagement with one or the other of contacts 9, 10, the buffer serving to prevent further movement of such arm as shown in Fig. 2.

In operation suppose the operating arm 20 to be moved to the left from the position shown in Fig. 1. As soon as the element 7 is moved somewhat to the left by the operating arm, the spring 13 of element 8 will cause the latter to move against the slidable buffer and into engagement with contact 10, as shown in Fig. 2. Further movement of the operating arm will cause the contact arm 7 which will engage the initial contact 14 to close the armature circuit causing the motor to start. The armature circuit will then be as follows:—From the main 3 through the series field coil, if such field winding be used, then to contact 10, arm 8, armature 4, arm 7 to initial contact 14, then through the starting resistance 11' to the final contact 19 and then to supply main 2. Further movement of the operating arm 20 will cause the contact element 7 to be moved therewith, and the starting resistance will gradually be cut out of the armature circuit until in final position all the resistance will be removed and the motor operated at full speed. In this final position, the operating and contact arms become interlocked and the novoltage magnet 15 will retain the contact arm in final position as above referred to and as shown in Fig. 2. By reason of this interlocking of the arms, the operator cannot move the operating arm to the off position or to start the motor in the opposite direction without first moving the contact arm 7 out of the influence of the novoltage magnet and so cause the spring 16 to move the arm to off position. If novoltage should occur when the contact arm 7 is in final position, as shown in Fig. 2, or if the motor circuit should be opened, or if the circuit of the novoltage magnet should be opened as by push button switch 29, the arm 7 will be released and the spring 16 will throw this arm, together with arm 20, to the off position. When the arm 7 is moved toward off position by its spring, it will strike the buffer head 27 which in turn will drive contact arm 8 from engagement with contact 10. Short circuiting of the motor armature by both contacts 9, 10 being engaged simultaneously by their arms, is thus avoided. If it be desired to start and operate the motor in the opposite direction, the arm 20 will be moved to the right, and engage pin 25 on arm 8, and so move this contact arm toward the initial contact 11. If contact arm 7 has not already engaged contact arm 9 by force of spring 16, the moving of arm 8 to the right away from the buffer head 27' will permit spring 16 to move the arm 7 into engagement with contact 9. When the armature circuit is closed by arm 8 engaging the initial resistance 11, the motor will start in the opposite direction and the circuit will be as follows:—From line 3 through the field winding 6 to contact 9, element 7, through the armature in the direction opposite to that previously considered to contact 8, through the starting resistance to the final contact 18, and then to the other supply main 2. Continued movement of the operating arm 20 and the contact arm 8 will gradually remove the armature resistance from the circuit and bring the motor to full speed. In the final position, arm 8 will be retained by magnet 12 and automatically released upon occurrence of no voltage or interruption of circuits.

It will be seen by the construction and circuit connections above described that the operation of the motor in either direction is dependent upon one of the contact arms being in such position as to connect one terminal of the armature to one side of the line and is also dependent upon the other contact arm being moved to connect the other terminal of the motor armature to the other side of the line.

It will further be apparent that the contact elements are so interrelated that improper operation of the contact elements is prevented.

Although I have shown my invention applied to starting devices for the motor, the same may be applied to regulating means. Also any other device than a motor may be controlled, and the form or function of the contact elements may be other than that shown and described.

Various other modifications may embody my invention, and the latter may be used in conjunction with additional apparatus if desired.

Having thus described my invention, I declare that what I claim as new and desire to secure by Letters Patent, is,—

1. The combination of a supply circuit, a translating device, two independently movable switches, connections for connecting each of said switches to either of the supply mains, and means for insuring the connection of one of said switches to one supply main when the other of said switches is connected to the other of said supply mains.

2. The combination of a supply circuit, a translating device, two independently movable switches for connecting either supply main to either terminal of said device, and means for insuring the connection of one terminal of said device to one of said supply mains by one of said switches when the other terminal of said device is connected to the other of said supply mains by the other of said switches.

3. The combination of a supply circuit of constant electromotive force, an electric motor having a field winding energized independently of its armature current, and two spring actuated starting resistance controlling elements, the said elements being in series with each other and with the motor armature across said supply circuit, and means for reversing the current through said elements and through the motor armature.

4. The combination of a supply circuit, a translating device, a switch for connecting one terminal of said device to either of the supply mains, a second switch for connecting the other terminal of said device to either of the supply mains, and a resistance coöperating with each of said switches for controlling the current through said translating device.

5. The combination of an electric motor, and a reversing rheostat comprising two armature controlling independently movable elements controlling the direction of rotation of the motor armature, and two no-voltage protective windings connected in a closed circuit containing a field winding of the motor.

6. The combination of an electric motor having an armature winding and a field winding, and two independently movable armature controlling elements, each of said elements having a coöperating no-voltage protective device.

7. The combination of a supply circuit, a translating device, a controlling resistance, a switch element for connecting one terminal of said device through said resistance to one of the supply mains and for connecting said terminal to the other of said supply mains, and a second switch element for connecting the other terminal of said device to either of the supply mains.

8. The combination of a supply circuit, a translating device, a controlling resistance, a switch element for connecting one terminal of said device through said resistance to one of the supply mains and for connecting said terminal to the other of said supply mains, and a second switch element for connecting the other terminal of said device to either of the supply mains, and means for insuring proper relative operation of said switch elements.

9. The combination of an electric motor and a reversing rheostat comprising two hand controlled starting levers, one of which levers when moved in one direction starts the motor in one direction, and the other of which levers when moved in the opposite direction starts the motor in the opposite direction, and a no-voltage device coöperating with each of said levers.

10. The combination of an electric motor, and two independently movable starting contact elements having a common resistance for starting the motor, one of said elements being for starting the motor in one direction and the other of said elements being for starting the motor in the opposite direction, means for insuring proper operation of said elements, and a no-voltage protective device for each contact element respectively.

11. The combination of an electric motor, two independently movable resistance controlling elements for starting the motor, one in one direction and the other in the opposite direction, and an operating lever for controlling the movement of said two elements, said motor having a field winding energized independently of its armature current.

12. The combination of an electric motor, two independently movable resistance elements for starting the motor, one in one direction and the other in the opposite direction, a single lever for controlling the movement of both of said elements, and a no-voltage protective device coöperating with each of said elements respectively.

13. The combination of an electric motor, and controlling and reversing mechanism therefor comprising two independently movable armature controlling elements, one of said elements adapted to control the rotation of the armature in one sense and the other adapted to control the rotation in the other sense, two no-voltage devices coöperating with the movable elements respectively, and said motor having a field winding energized independently of said movable elements.

14. The combination of an electric motor, armature reversing mechanism comprising two independently movable circuit controlling elements, and two no-voltage protective windings having circuit connections permanently connecting them to a field winding of the motor.

In testimony whereof I affix my signature, in presence of two witnesses.

WILLIAM SCHWAGERMANN.

Witnesses:
LEONARD KEBLER,
WALTER H. MOTT.